US007697528B2

(12) United States Patent  (10) Patent No.: US 7,697,528 B2
Parry et al.  (45) Date of Patent: Apr. 13, 2010

(54) MULTILINK TRUNKING FOR ENCAPSULATED TRAFFIC

(75) Inventors: Simon Parry, Harlow (GB); Robert Friskney, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 452 days.

(21) Appl. No.: 11/264,634

(22) Filed: Nov. 1, 2005

(65) Prior Publication Data

US 2007/0098006 A1 May 3, 2007

(51) Int. Cl.
*H04L 12/28* (2006.01)
(52) U.S. Cl. .................................. 370/392; 370/389
(58) Field of Classification Search .................. 370/389, 370/474, 395.32
See application file for complete search history.

(56) References Cited

U.S. PATENT DOCUMENTS

| 6,560,233 | B1 * | 5/2003 | Hatanaka et al. ............. 370/401 |
| 6,618,388 | B2 * | 9/2003 | Yip et al. ..................... 370/401 |
| 6,807,179 | B1 * | 10/2004 | Kanuri et al. ........... 370/395.31 |
| 6,888,797 | B1 | 5/2005 | Cao et al. |
| 7,110,419 | B1 * | 9/2006 | Linander ..................... 370/461 |
| 7,277,386 | B1 * | 10/2007 | Ferguson et al. ............. 370/230 |
| 2003/0063611 | A1 | 4/2003 | Schaub et al. |
| 2003/0128708 | A1 * | 7/2003 | Inoue et al. ............. 370/395.42 |
| 2004/0081203 | A1 * | 4/2004 | Sodder et al. ............... 370/469 |
| 2004/0095882 | A1 * | 5/2004 | Hamzah et al. ............. 370/229 |
| 2004/0184407 | A1 * | 9/2004 | Pok et al. .................... 370/236 |
| 2004/0184408 | A1 * | 9/2004 | Liu et al. .................... 370/236 |
| 2005/0220096 | A1 * | 10/2005 | Friskney et al. ............. 370/389 |
| 2005/0286541 | A1 * | 12/2005 | Bottorff et al. .............. 370/401 |
| 2006/0059163 | A1 * | 3/2006 | Frattura et al. ............... 707/10 |
| 2006/0198323 | A1 * | 9/2006 | Finn .......................... 370/256 |

FOREIGN PATENT DOCUMENTS

| EP | 1 130 849 | 9/2001 |
| EP | 1 300 992 | 4/2003 |

OTHER PUBLICATIONS

Suzuki et al., "Backbone Provider Bridge Frame Format Issues", Oct. 2004.*

* cited by examiner

*Primary Examiner*—Kwang B Yao
*Assistant Examiner*—Kenan Cehic
(74) *Attorney, Agent, or Firm*—Kent Daniels; Blake, Cassels & Graydon LLP

(57) ABSTRACT

A node of a frame-based network has a group of outgoing links which are to be treated as an aggregated group of links. A frame distributor performs a distribution function on data frames which are intended for transmission on the group of links. The frame distributor determines if the data frame is an encapsulated data frame which forms part of a tunnelled traffic path across the network. If the data frame does form part of a tunnelled traffic path across the network, the frame distributor allocates the data frame to one of the group of links using at least part of an identifier from the header of the data frame. The identifier represents a service with which the data frame is associated, a customer or user of the data frame, or the tunnelled traffic path, which have greater variability than the backbone destination and source addresses.

27 Claims, 5 Drawing Sheets

MULTILINK TRUNKING FOR ENCAPSULATED TRAFFIC

FIELD OF THE INVENTION

This invention relates to allocating data frames to an aggregated group of links in a network.

BACKGROUND TO THE INVENTION

For many years now, telecommunications carriers have been deploying packet-switched networks in place of, or overlaid upon, circuit-switched networks for reasons of efficiency and economy.

Link Aggregation (IEEE 802.3ad), also known as Multi-Link Trunking (MLT) is a standardised way of bonding together groups of Ethernet links, called a Link Aggregation Group (LAG), to make them appear as a single higher-capacity link. MLT simplifies network operations by reducing the number of links that need to be managed and by improving redundancy. It is implemented by many vendors on existing hardware. MLT has been incorporated into the IEEE 802.3 standard at clause 34. The MLT standard defines a Frame Distributor which is responsible for taking outgoing frames of data from a Medium Access Control (MAC) client and transmitting them through the set of links that form the Link Aggregation Group. IEEE 802.3 does not define an algorithm for distributing frames between links in the LAG, but simply requires that any algorithm shall not cause: (i) mis-ordering of frames that form a conversation or (ii) duplication of frames. Consequently, practical systems using MLT rely on a proprietary hashing algorithm to allocate frames between the links that make up a LAG and currently each vendor has their own implementation.

Nortel Networks implements MultiLink Trunking in their ERS8000 (Ethernet Routing Switch) Series of 10 Gigabit Ethernet (10 GE) switches. The hashing algorithm implemented by this product allocates frames to links in a LAG by an operation based on part of the source and destination MAC addresses of an Ethernet frame or, if an Ethernet frame is carrying an IP packet, uses the IP addresses of packets. Another vendor—Cisco-implemented MLT in a protocol called EtherChannel™. Frame distribution is based on a MAC address (Layer 2), an IP address (Layer 3) or a port number (Layer 4). Distribution can be based solely on the source address, destination address, or both source and destination address. Both of these existing algorithms are optimised for conventional Ethernet traffic. These conventional algorithms rely on the diversity of source and destination MAC addresses that are seen in arriving frames to spread the arriving traffic across the links that make up the Link Aggregation Group.

MAC-in-MAC (M-in-M, IEEE 802.1ah, Provider Backbone Bridges) is a forthcoming standard which allows customer Ethernet traffic to be carried transparently across a carrier Ethernet network, by encapsulating the customer frame inside a second Ethernet header. When the existing hashing algorithms outlined above are applied to MAC-in-MAC traffic they result in a poor distribution of frames between links in a LAG because the source and destination MAC addresses operated upon by those algorithms have a very limited address space, e.g. the several hundred addresses of the carrier network compared to many thousands of addresses for conventional Ethernet.

The present invention seeks to improve the distribution of frames across links in a link aggregation scheme.

SUMMARY OF THE INVENTION

A node of a frame-based network has a group of outgoing links which are to be treated as an aggregated group of links. A frame distributor performs a distribution function on data frames which are intended for transmission on the group of links. The frame distributor determines if the data frame is an encapsulated data frame which forms part of a tunnelled traffic path across the network. If the data frame does form part of a tunnelled traffic path across the network, the frame distributor allocates the data frame to one of the group of links using a distribution function which operates on at least part of an identifier from a header of the data frame. The identifier represents a service with which the data frame is associated, a customer or user of the data frame, or the tunnelled traffic path.

The term 'a header of the data frame' includes both the outer header, i.e. header information which is added to a data frame as part of the encapsulation process, as well as the inner header, i.e. the original header of the customer's data frame before encapsulation occurred. This can include parts of the inner header used by higher protocol layers. In the case of TCP/IP over Ethernet, this will include TCP/UDP parts of the inner header of the data frame.

For a carrier network, a trunk can be established across the carrier network as a tunnelled path between a particular carrier source address and carrier destination address. The trunk can be used to carry many different services. Each service within a trunk can be represented by a Service ID or similar identifier. Allocating data frames to links using a distribution function which operates ('hashes') on a service, customer or user-specific identifier in the encapsulated data frame allows a better distribution of frames among the group of links. This is because the identifier varies for each service, or each customer or user. The identifier has much greater variability than the carrier source and destination addresses in the outer header of the encapsulated data frame. Distributing traffic by operating on the Service ID field is particularly advantageous as it also obeys the rule that all data frames associated with the same service (or application) should always be sent down the same link in the MLT group. This minimises jitter. Since the header format is defined (or will be defined) by the IEEE, it is easy to adapt current firmware to hash on a different part of the data frame. Preferably, the encapsulation of the data frame occurs at the same OSI Layer as the original data frame, such as MAC-in-MAC or Pseudowire over MAC at OSI Layer 2.

In an enterprise environment a service can represent a connection across the carrier network between a pair of customer sites. Traffic between a particular pair of customer sites can be carried across the carrier network by multiple services, each service being represented by a particular Service ID. As an example, one Service ID can represent voice traffic while another represents data traffic. Each site will typically have many end users which share the service. Where the carrier network forms a backbone which is shared by other carriers, each service can represent a traffic flow between edge switches for each of those carriers.

While the frame distributor can operate on only the Extended Service ID field, it is also possible to hash on the Extended Service ID in combination with one or more of: the carrier (backbone) source and/or destination address; the backbone (outer header) VLAN tag, the carrier (backbone) source and destination addresses or address information taken from the inner header. Alternatively, the frame distributor can operate solely on fields of the inner header, such as the inner header source address and inner header destination address which represent addresses in the customer and end-user address space, or fields taken from a part of the inner header at a higher protocol layer, such as TCP/UDP fields. These have a similar advantage of providing a greater variability than the carrier address fields. As a further alternative, the frame distributor can operate on a field which identifies the tunnel (trunk) across the network. In this case, it is preferable that the frame distributor operates on a combination of the field which identifies the tunnel and another field which may vary according to a traffic flow, such as a field which indicates priority.

The node can be an edge node of the frame-based network or an intermediate node within the network. In the case of an edge node in the frame-based network, an interface of the edge node will receive a data frame, firstly encapsulate the data frame to form an encapsulated data frame, and then pass the encapsulated data frame to the frame distributor for allocation to one of the outgoing links. In the case of an intermediate node in the frame-based network, the node will receive a data frame which is already encapsulated.

A further aspect of the invention provides a node for a frame-based network which includes the frame distributor described above.

A further aspect of the invention provides a Provider Backbone Bridge Network (PBBN) for transporting customer traffic in the form of data frames between Ethernet networks connected to the PBBN, the PBBN being arranged to form tunnelled paths across the PBBN for carrying the customer traffic, the PBBN comprising at least a pair of network nodes which are connected by an aggregated group of links. At least one of the nodes has a frame distributor of the above kind for allocating data frames to links of the aggregated group of links.

A further aspect of the invention provides a method of allocating data frames at a node of a frame-based network, the node having a group of outgoing links which are to be treated as an aggregated group of links, the method comprising:

receiving a data frame intended for transmission on the group of links;

determining if the data frame is an encapsulated data frame which forms part of a tunnelled traffic path across the network;

and, if the data frame does form part of a tunnelled traffic path across the network, allocating the data frame to one of the group of links using a distribution function which uses at least part of an identifier from a header of the data frame, the identifier representing a service with which the data frame is associated, a customer or user of the data frame, or the tunnelled traffic path.

The functionality described here can be implemented in software, hardware or a combination of these. The invention can be implemented by means of hardware comprising several distinct elements, and by means of a suitably programmed computer. Accordingly, another aspect of the invention provides instructions (software) for causing a processor of a frame distributor to allocate data frames to links in the above manner.

It will be appreciated that software may be installed on a network node at any point during the life of the equipment. The software may be stored on an electronic memory device, hard disk, optical disk or other machine-readable storage medium. The software may be delivered as a computer program product on a machine-readable carrier or it may be downloaded directly to the node via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

For the purpose of this description the term bytes and octets are used interchangeably.

Figure 1:
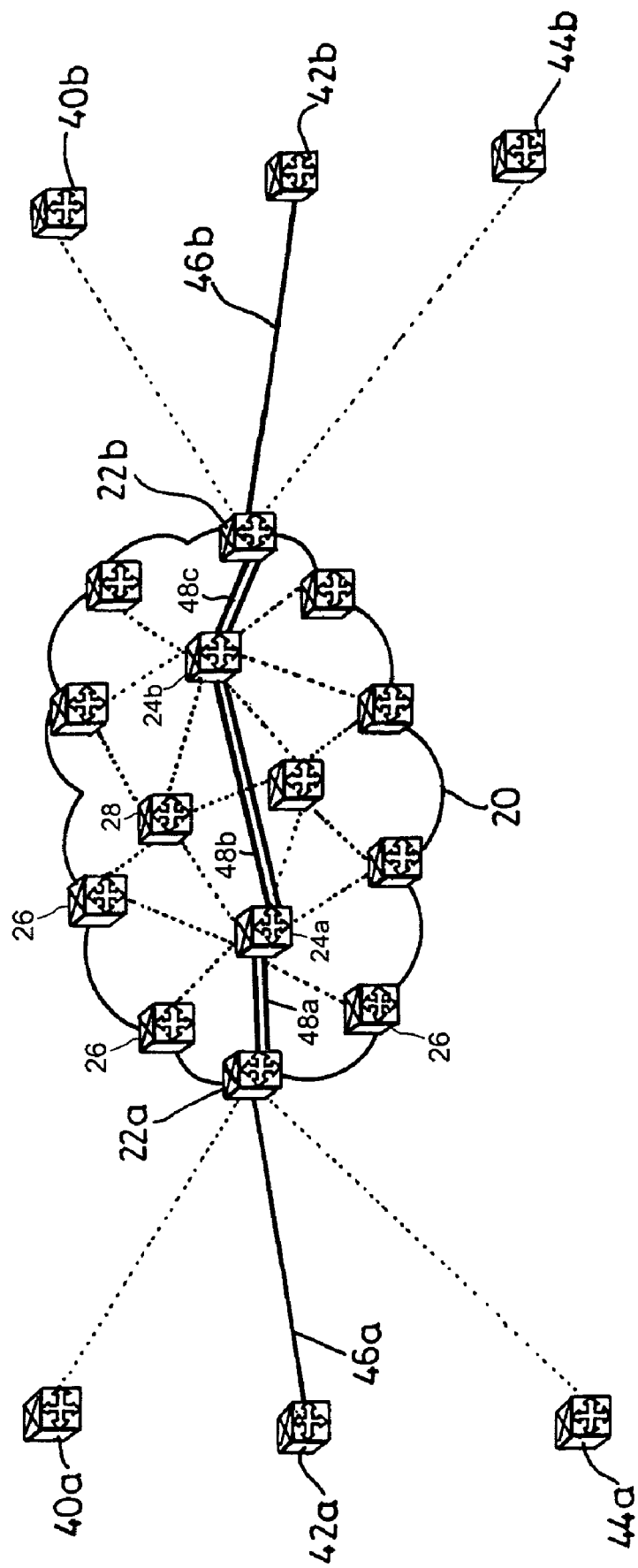
FIG. 1 shows an arrangement of Ethernet switches forming a carrier network and a connection across the carrier network.

FIG. 1 shows an arrangement of Ethernet switches and communications links forming a carrier network. Carrier network cloud 20 comprises Ethernet switches 22a, 22b, 24a, 24b, 26 and 28. Ethernet switches 22a, 22b and 26 are located at the edges of carrier network 20, whereas Ethernet switches 24a, 24b, and 28 are located in the core network. Communications links (shown as straight lines) are provided between Ethernet switches 22a, 22b, 24a, 24b, 26 and 28. These communications links may be, for example, relatively long distance links over optical equipment such as SONET/SDH equipment with Ethernet interfaces using Generic Framing Procedure (GFP) (ITU-T Recommendation G.7041/Y.1303). Although a carrier network is shown as an example of the type of network that the Ethernet switches can be used with, the invention is not limited to this. In addition, although core network switches 24a, 24b, and 28 are shown with a fully-meshed configuration, i.e. there is a direct communications link connecting each core network switch 24a, 24b, and 28 to each other, this is not essential.

In FIG. 1 three customers having respective pairs of geographically distant Ethernet switches (40a and 40b, 42a and 42b, 44a and 44b) are shown connected to carrier network 20 via edge Ethernet switches 22a and 22b respectively. The communications links between edge switches 22a and 22b and customer switches 40a, 40b, 42a, 42b, 44a, and 44b may be dedicated links such as T1, E1 leased lines or access links such as digital Subscriber Lines (DSLs).

The carrier Ethernet network 20 provides connectivity between customer sites and can represent a Provider Backbone Bridge Network (PBBN) as defined in the emerging standard IEEE 802.1ah—Virtual Bridged Local Area Networks: Provider Backbone Bridges. According to IEEE 802.1ah a Provider Backbone Bridge Network (PBBN) can interconnect multiple Ethernet networks, one type of which is Provider Bridge Networks (PBN) of the type defined in IEEE 802.1ad. Each Ethernet network is typically a network belonging to an enterprise or another operator.

Carrier edge switches 22a, 22b, 26 may be logically separated into a single Provider Edge-(PE-) Core and one or more PE-Edge functions. The PE-Edge is the ingress/egress point at which customer traffic enters or leaves the carrier network 20. The PE-Core preferentially encapsulates incoming Ethernet traffic from the customer using Media Access Control (MAC) in MAC encapsulation (or, if desired, Pseudo-Wire over MAC encapsulation) and forwards the encapsulated traffic across the carrier network 20. This embodiment is preferred as a mechanism to limit the number of table entries required because only the MAC address space of the carrier network need be recognised, and not the whole of the customer's MAC address space, which could be changed independently. Similarly, the PE-Core decapsulates (strips) outgoing Ethernet traffic and forwards the stripped traffic on to the customer via the appropriate PE-Edge. VLAN tags are often used to provide customer separation at the logical PE-Core with each different customer site connected to each edge switch having a unique VLAN tag. Stacked VLAN (i.e. VLAN-in-VLAN encapsulation or Q-in-Q) may be used to protect any VLAN tags used by the customer traffic. For example, customer switch 42a may send Ethernet traffic over communications link 46a to the logical PE-Edge of edge switch 22a. Logical PE-Core of edge switch 22a encapsulates each Ethernet frame in a further Ethernet frame using the MAC address of the ingress port on edge switch 22a as the source address and the MAC address of the appropriate egress point—in this case a port on edge switch 22b—as the destination address. The encapsulated traffic is forwarded across a connection comprising links 48a, 48b, 48c of carrier network 20 to edge switch 22b. Connections may be typically trunked in the sense that traffic from multiple customers will be routed through the same connection. Alternatively, those skilled in the art will appreciate that separate connections 48 could be used for each customer. At the PE-Core of edge switch 22b, the original frames are stripped of their encapsulation and sent over communications link 46b via PE-Edge of edge switch 22b to customer switch 42b.

Figure 2:
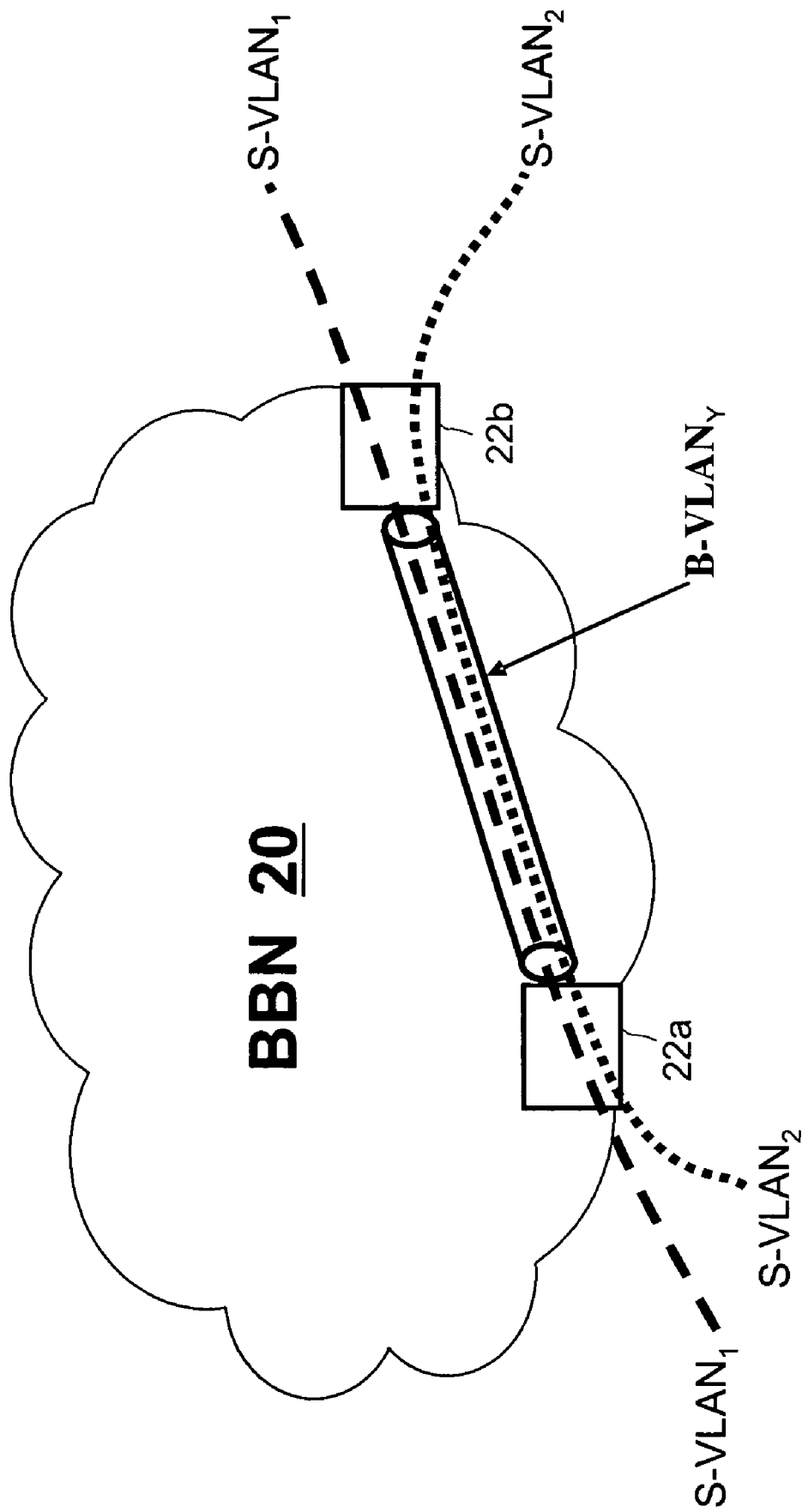
FIG. 2 shows tunnelled paths across a Provider Backbone Bridge Network.

FIG. 2 schematically shows a tunnel across core network 20 between a source edge node 22a and a destination edge node 22b of the core network 20. The tunnel can carry multiple traffic flows representing the traffic of different customers. Within core network 20, the traffic of each customer is identified by a distinctive Extended Service ID (I-SID). Although a point-to-point tunnel is shown in FIG. 2, the tunnel can also take the form of a multi-point tunnel which connects multiple edge nodes of core network 20. A collection of point-to-point (p2p) connections across network 20, each represented by a particular Service ID, can be combined to provide an any-to-any (a2a) service.

Figure 3:
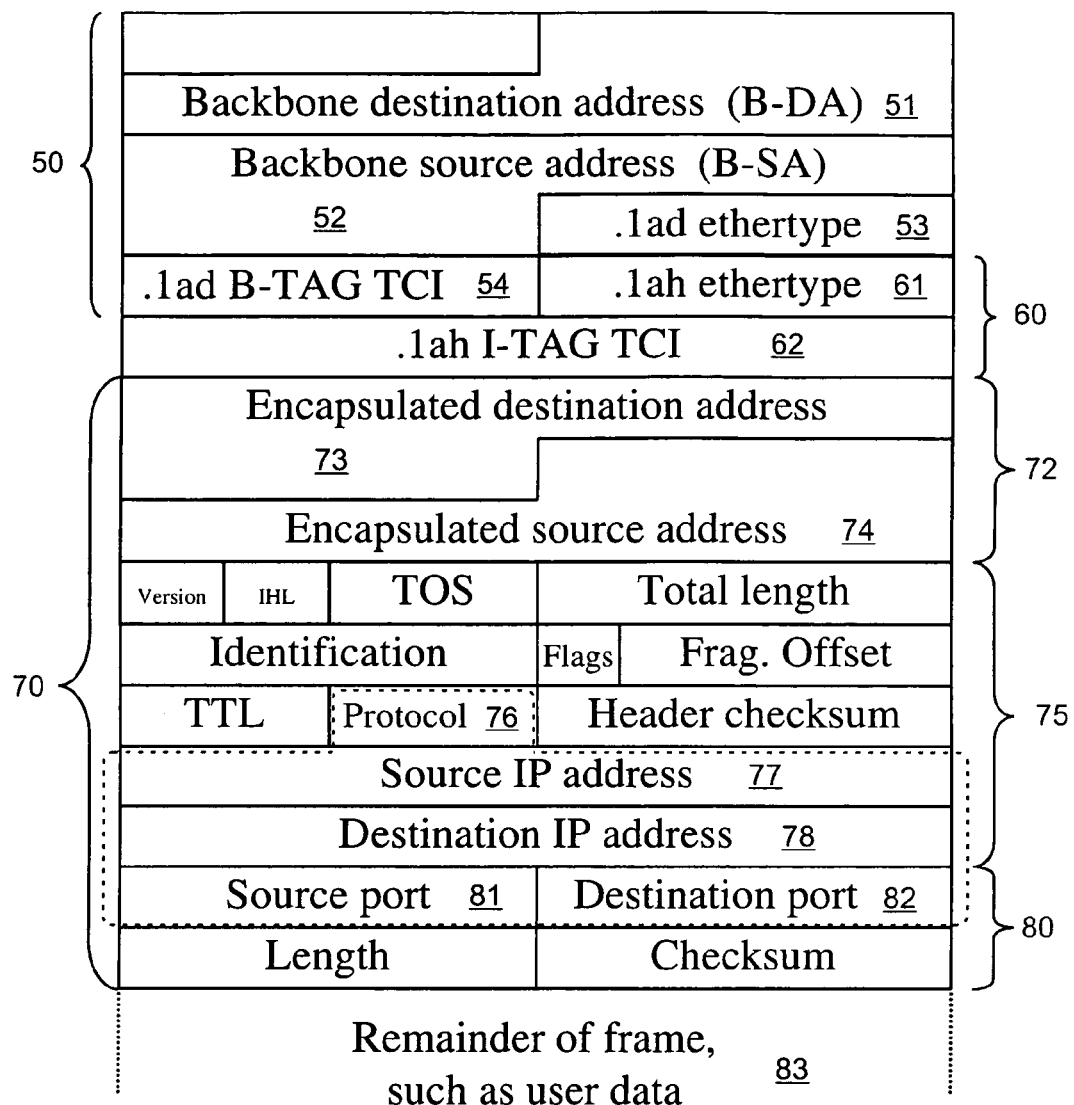
FIG. 3 shows the format of a header for a MAC-in-MAC (IEEE 802.1ah) encapsulated data frame.

The format of a MAC-in-MAC data frame is shown in FIG. 3. The data frame begins with a header which comprises a backbone header 50, an IEEE 802.1ah encapsulation header 60 and the header 70 of the customer data frame. The header 70 of the customer data frame comprises an Ethernet header 72, an IPv4 header 75 and a UDP header 80. The backbone header 50 begins with the Backbone Destination Address (B-DA) 51 and Backbone Source Address (B-SA) 52. These addresses will correspond to addresses of a port at which the traffic enters the core network (e.g. a port of switch 22a in FIG. 1) and leaves the core network (e.g. a port of switch 22b in FIG. 1). An IEEE 802.1ad Ethertype field 53 precedes an IEEE 802.1ad B-TAG TCI field 54 which includes a VLAN tag, also known as a B-VID (Bearer VLAN Identifier). This is used by the backbone (core) network 20 to route the encapsulated frame within the bearer network 20. In FIG. 2, the tunnelled path B-VLAN$_Y$ between nodes 22a, 22b will be identified by a particular value of the B-VID field within the B-TAG. Next, the IEEE 802.1ah encapsulation header 60 comprises an IEEE 802.1ah Ethertype field 61, which declares that the frame is of type MAC-in-MAC. This is followed by a four byte Extended Service VLAN Tag (I-TAG) field 62. Finally, the header carries the header of the encapsulated customer data frame 70. This begins with the encapsulated Ethernet header 72, which comprises an encapsulated Destination Address 73 and an encapsulated Source Address 74. These addresses correspond to addresses of the customer/end-user and can correspond, for example, to switches 42a, 42b in FIG. 1. An IPv4 header 75 follows. This includes the following fields, in order: a Version identifier (i.e. IPv4); the Internet Header Length (IHL) in 32-bit chunks (in this case=5); Type of Service (TOS) which is now used for the Diffserv Codepoint (DSCP); Identification, used for fragment reassembly; Flags which are used to identify May Fragment/Don't Fragment, Last Fragment/More Fragments; Fragment Offset, used where the IP packet (max size 64 kb) is larger than the Layer 2 frame will permit; Time to live (TTL); Protocol field 76; a header checksum field and finally the Source IP address 77 and Destination IP address 78. The UDP header 80 comprises a Source Port 81, Destination Port 82, Length field and checksum. The remainder of the customer data frame 83, following the UDP header 80, is typically used to carry customer data. The header can, of course, vary from the format shown here. The IPv4 header 75 shown here can be replaced by an IPv6 header.

Figure 4:
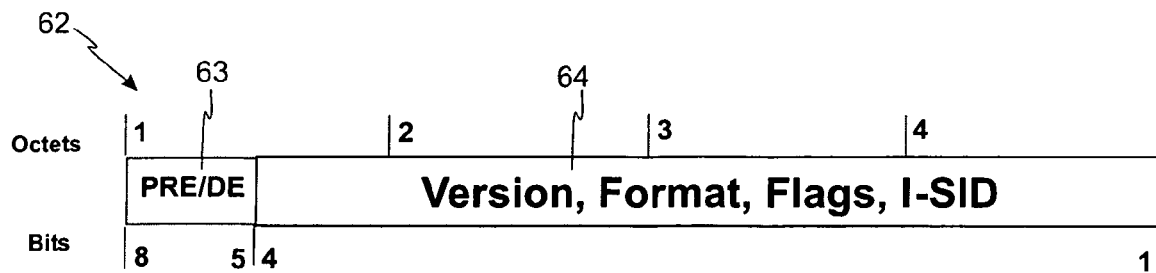
FIG. 4 shows part of the header of FIG. 3 in more detail.

FIG. 4 shows the I-TAG field 62 in more detail. An initial field carries Priority/Drop Eligible (PRE/DE) information 63. The remainder 64 of the field carries, inter alia, an Extended Service ID (I-SID), also known as an Extended Service VLAN ID. The Extended Service ID identifies traffic of one customer from that of another customer. There are proposals to use an Extended Service ID of between 20 and 28 bits in length. Regardless of the length and exact format, the I-SID serves the purpose of identifying a particular service within network 20.

Any pair of nodes within core network 20 can use Multi-Link Trunking (as described in IEEE 802.3 ad) to bond together a group of Ethernet links into a Link Aggregation Group (LAG). This allows the group of links to appear as a single higher-capacity link and has advantages of simplifying network operations by reducing the number of links that need to be managed and by improving redundancy. Referring again to FIG. 1, this shows a path between edge nodes 22a, 22b which passes through intermediate nodes 24a, 24b of the core network. Each leg 48a, 48b, 48c of the path across the core network can take the form of a group of links which are operated as a Link Aggregation Group. Although each leg 48a, 48b, 48c is shown as a Link Aggregation Group, only some of the legs 48a, 48b, 48c between nodes may be operated as a Link Aggregation Group. The operator of the core network 20 will determine how traffic is carried across network 20 and which nodes will be connected by links which are formed into Link Aggregation Groups. As described above, although each individual link within a Link Aggregation Group takes the same logical path between nodes (indicated by a pair of parallel lines in FIG. 1) the routing of that link at lower network layers can differ, and is determined by the network operator.

Figure 5:
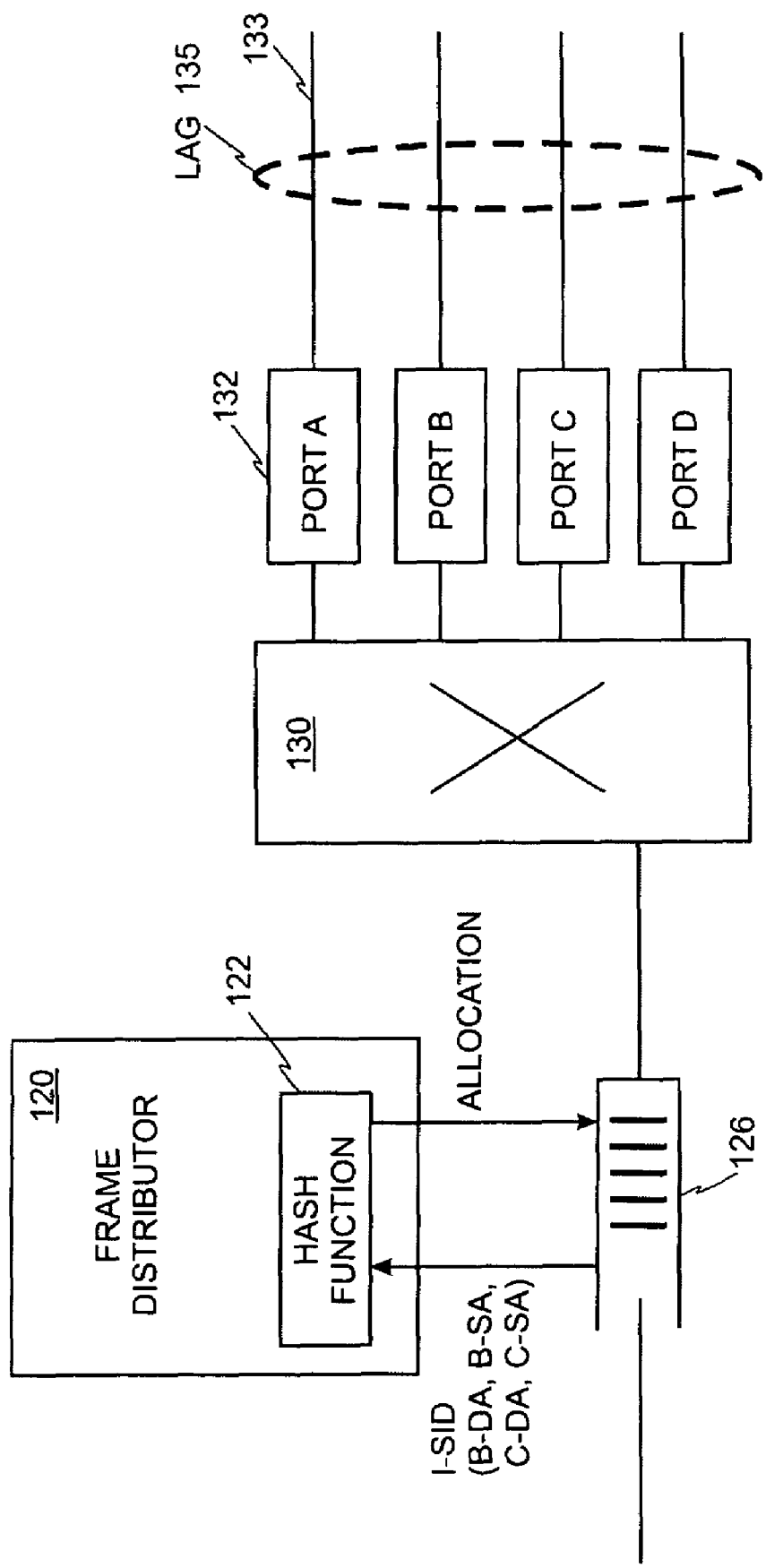
FIG. 5 shows apparatus at a node for performing MultiLink trunking.

FIG. 5 schematically shows apparatus at a node which performs MultiLink Trunking (MLT). Data frames are received from a line interface, or from another processing function of the node. In the case of a line interface, the incoming signal is converted from a format used on an incoming link to a baseband electrical digital signal which can be used by the following stages. Typically, this involves receiving, and demodulating, an optical signal and decoding the demodulated signal from a line code used for transmission. Each data frame will be associated with a MAC client in the network. Received data frames are buffered 126. A frame distributor 120 inspects the header of each received frame and allocates each frame to one of a set of egress ports (Port A-Port D) via switch or multiplexer 130. The frame distributor 120 marks the frames in order for the switch or multiplexer 130 to route the frame to the correct port within the set of ports 132. Each of the set of ports 132 connect to an outgoing communication link 133 and the set of links form a Link Aggregation Group (LAG) 135. The frame distributor 120 performs a hashing function 122 based on the values of one or more fields within the header of a frame. One example hashing function 122 would be to take the lowest four bits of the I-SID, add this number to the lowest four bits of the Destination Address 11 and the lowest four bits of the Source Address 12, then divide the sum by the number of ports in the LAG, and use the remainder (the modulo) to choose a port. The frame distribution function of the frame distributor can be implemented entirely in hardware, by a programmable array, by a processor (or set of processors) which execute instructions to perform the function, or any combination of these as will be well understood by a person skilled in the art.

Figure 6:
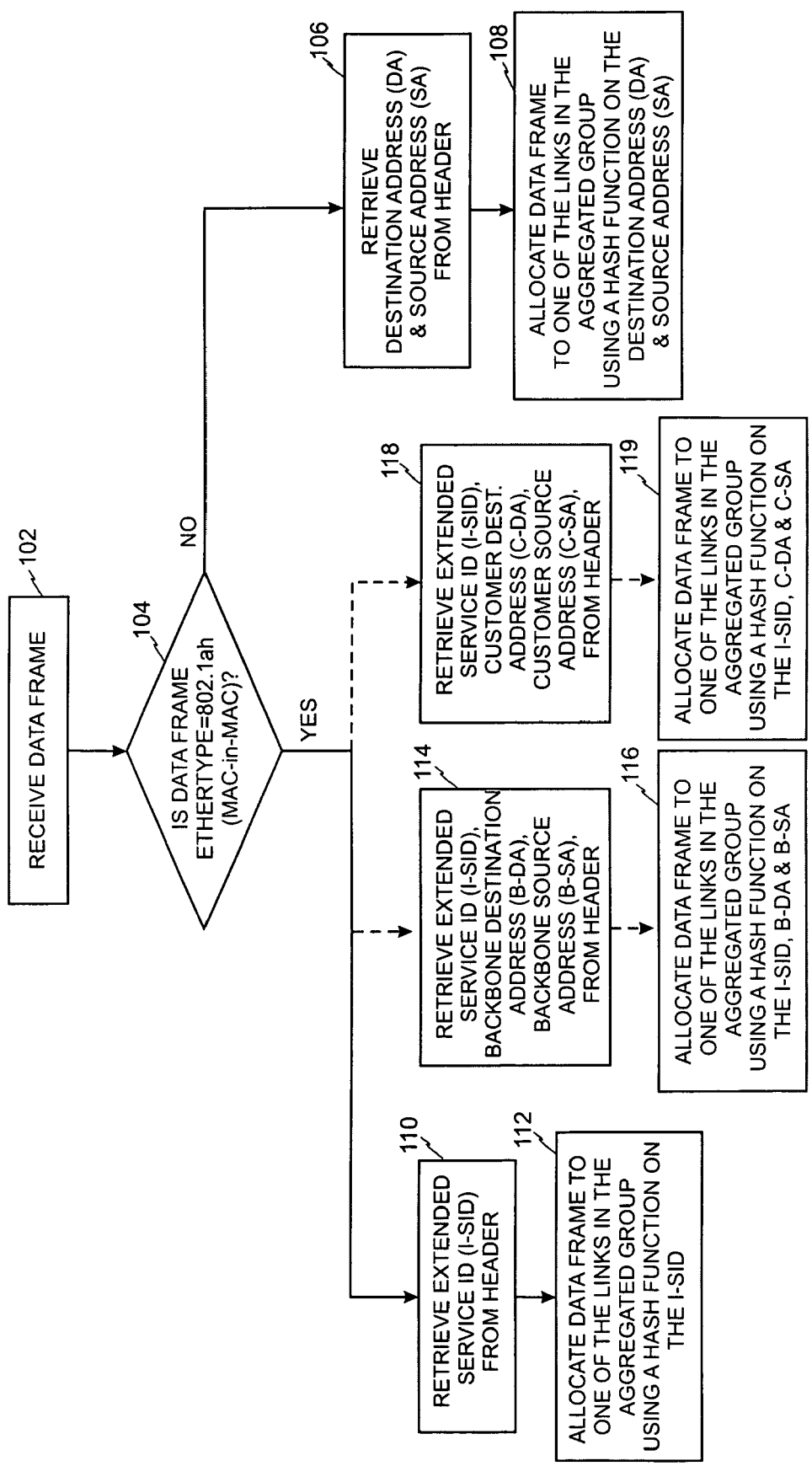
FIG. 6 shows operation of a frame distributor in the apparatus of FIG. 5.

FIG. 6 shows the method performed by the apparatus shown in FIG. 5. Firstly, a data frame is received in buffer 126 at step 102. At step 104 the frame distributor 120 inspects the header of a data frame and determines whether the frame contains an IEEE 802.1ah Ethertype field which indicates that the data frame is encapsulated according to IEEE 802.1ah (MAC-in-MAC). If the data frame is not of type 802.1ah then the frame distributor operates in a 'conventional' manner and retrieves the destination and source addresses from the start of the header at step 106. The frame distributor performs a hashing function on the destination and source addresses, at step 108, to allocate the data frame to one of the outgoing ports 132/links 133. However, returning to step 104, if the frame is of type 802.1ah then the frame distributor operates in a different manner and proceeds to step 110. As described above, 802.1ah frames are sent between a limited number of switches on the edge of core network 20 and thus the destination and source addresses carried at the start of the frame correspond to the addresses of ports at the edge switches of network 20. These addresses show little variability and thus form a poor basis for hashing. At step 112 the frame distributor retrieves the Extended Service ID (I-SID within field 19B, FIG. 3) from the header of the data frame. This will vary on a per-customer basis and traffic between common edge switches in network 20, but for different customers, will take different I-SID values. The frame distributor performs a hashing function on the Extended Service ID to allocate the data frame to one of the outgoing ports 132/links 133. Steps 110, 112 show one preferred way of processing an 802.1ah data frame. Steps 114, 116 and 118, 119 show two alternative ways in which the frame distributor can allocate data frames to ports. In step 114 the frame distributor retrieves the Extended Service ID (I-SID), Backbone Destination Address (B-DA) and Backbone Source Address (B-SA) and performs, at step 116, a hashing function on all of these values. In step 118 the frame distributor retrieves the Extended Service ID (I-SID), Customer Destination Address (C-DA) and Customer Source Address (C-SA) and performs, at step 119, a hash function on all of these values. It is not necessary for the hashing function to operate on the full value of the I-SID, B-DA, B-SA, C-DA, C-SA, each of which may be up to 6 bytes in length. Instead, the hash function can operate on a number (e.g. 6) of the least significant bits of that field, or fields. The least significant bits are the ones which will show most variability and thus are most useful digits on which to perform the hash function. Data frames associated with a particular service will each be tagged with the same value of Extended Service ID (I-SID). Different services will be tagged with different values of I-SID. Although the traffic of many different services may flow between the same pair of Backbone Destination Address 51 and Backbone Source Address 52, the different values of the I-SID can allow traffic to be distributed by the frame distributor.

The examples of hash functions shown at steps 110-119 of FIG. 6 are not the only hash functions that can be performed. It is possible to hash on fields retrieved from the inner (customer) header: such as the Destination and Source Ethernet addresses 73, 74. Alternatively a hash function can be performed on the so-called 5-way IP match using fields retrieved from the inner IP header 75 and UDP header 80. The 5-way IP match includes: protocol field 76, Source IP address 77, Destination IP address 78, Source Port 81 and Destination Port 82 as shown by the group 85.

Alternatively, the hash function can operate on the backbone VLAN tag (B-VID) carried within B-TAG 54, either alone or preferably in combination with other fields which vary between different traffic flows, such as priority (also carried within B-TAG 54).

The MultiLink Trunking standard requires that frame ordering must be maintained for certain sequences of frame exchanges between MAC Clients (known as conversations). The hash function performed by the Frame Distributor 120 is deterministic, i.e. it will allocate a data frame to the same port whenever the input values are the same. As the Extended Service ID remains constant for a given customer's traffic flow, each data frame for that customer will be allocated to the same port in the Link Aggregation Group and thus data frames will remain in order.

In the above description, it is described how the backbone VLAN identifier field (B-VID) or outer-header VLAN tag, forming part of the B-TAG, identifies a tunnelled path within the backbone network. In a conventional Ethernet network the B-VID is typically allocated by a network management system that is trying to influence the routing of packets across the bearer network and individual nodes perform spanning-tree routing of data frames. It is also possible to operate network 20 in a connection-oriented manner in which a network management system precisely controls the routing of data frames across the bearer network 20. This manner of operation is described in co-pending U.S. patent application Ser. No. 10/818,685 and International Patent Application PCT/GB2005/001332, the contents of which are incorporated herein by reference. In a network operating in a connection-oriented manner the B-VID is logically allocated by the backbone network, depending on the route to be followed by that data frame. A combination of the B-VID and destination and/or source address of a data frame determine the mapping between ingress and output nodes applied by each Ethernet switch within network 20. Data frames of traffic which are to take different routes between a given pair of edge nodes are allocated different B-VIDs. For a uni-directional trunk, it is preferred that the destination node has ownership of the allocation of the B-VID because the destination node owns the destination bearer MAC address for that unidirectional trunk. Any two trunks going to the same destination MAC address must have different B-VIDs if they at any point diverge in route after having converged in route.

In future the IEEE 802.1ah encapsulation may be extended to include payloads of data in formats other than Ethernet. For example, IETF draft "draft-pan-pwe3-over-sub-ip-01" teaches how Pseudowire encapsulation can be used to carry many types of traffic within an Ethernet frame. Pseudowire is another Layer 2 technology. In this case the Psudeowire label identifies the service instance (i.e. traffic between a particular pair of end-users) and is a preferred field to hash on.

The invention is not limited to the embodiments described herein, which may be modified or varied without departing from the scope of the invention.

We claim:

1. A frame distributor for a node of a frame-based network, the node having a group of outgoing links which are to be treated as an aggregated group of links, the frame distributor comprising control logic which is operable to:
   receive a data frame intended for transmission on the group of outgoing links;
   determine whether the data frame is an encapsulated data frame encapsulated according to MAC-in-MAC or Pseudowire over MAC, and which forms part of a tunnelled traffic path across the network;
   and, if the data frame is such an encapsulated data frame and forms part of said tunnelled traffic path across the network, to allocate the data frame to one of the group of links using a distribution function which operates on at least a service identifier field of an Extended Service VLAN tag in an outer header of the data frame.

2. A frame distributor according to claim 1 wherein the distribution function further operates at least one other field in the outer header.

3. A frame distributor according to claim 2 wherein the distribution function operates on a backbone VLAN tag (B-VID) and priority bits which indicate the priority of the data frame.

4. A frame distributor according to claim 2 wherein the other field is at least one of: an outer header source address, an outer header destination address and an outer header VLAN tag.

5. A frame distributor according to claim 4 wherein the outer header source address and outer header destination address refer to switches in a backbone network.

6. A frame distributor according to claim 1 wherein the distribution function further operates on at least one field in an inner header of the data frame.

7. A frame distributor according to claim 1 wherein the identifier from an inner header is an inner header destination address or an inner header source address.

8. A frame distributor according to claim 1 wherein the distribution function operates on at least part of an inner header destination address and at least part of an inner header source address.

9. A frame distributor according to claim 8 wherein the inner header destination address and inner header source address are customer or user network addresses.

10. A frame distributor according to claim 1 wherein the distribution function operates on a sub-set of bits of the identifier.

11. A frame distributor according to claim 10 wherein the distribution function operates on the least significant bits of the identifier.

12. A frame distributor according to claim 1 wherein the frame-based network is an Ethernet network and the header of the encapsulated data frame carries an Ethertype identifier which indicates that the data frame is encapsulated and forms part of a tunnelled path.

13. A node for a frame-based network comprising the frame distributor of claim 1.

14. A Provider Backbone Bridge Network (PBBN) for transporting customer traffic in the form of data frames between Ethernet networks connected to the PBBN, the PBBN being arranged to form tunnelled paths across the PBBN for carrying the customer traffic, the PBBN comprising at least a pair of network nodes which are connected by an aggregated group of links and one of the nodes having a frame distributor according to claim 1 for allocating data frames to links of the aggregated group of links.

15. A method of allocating data frames at a node of a frame-based network, the node having a group of outgoing links which are to be treated as an aggregated group of links, the method comprising:
   receiving a data frame intended for transmission on the group of outgoing links;
   determining whether the data frame is an encapsulated data frame encapsulated according to MAC-in-MAC or Pseudo-wire over MAC, and which forms part of a tunnelled traffic path across the network;
   and, if the data frame is such an encapsulated data frame and forms part of said tunnelled traffic path across the network, allocating the data frame to one of the group of links using a distribution function which uses at least a service identifier field of an Extended Service VLAN tag in an outer header of the data frame.

16. A method according to claim 15 wherein the distribution function further operates on at least one other field in the outer header.

17. A method according to claim 16 wherein the at least distribution function operates on the backbone VLAN tag (B-VID) and priority bits which indicate the priority of the data frame.

18. A method according to claim 16 wherein the other field is at least one of: an outer header source address, an outer header destination address and an outer header VLAN tag.

19. A method according to claim 18 wherein the outer header source address and outer header destination address refer to switches in a backbone network.

20. A method according to claim 15 wherein the distribution function further operates on at least one field in an inner header of the data frame.

21. A method according to claim 15 wherein the identifier from the inner header is an inner header destination address or an inner header source address.

22. A method according to claim 15 wherein the distribution function operates on at least part of an inner header destination address and at least part of an inner header source address.

23. A method according to claim 22 wherein the inner header destination address and inner header source address are customer or user network addresses.

24. A method according to claim 15 wherein the distribution function operates on a sub-set of bits of the identifier field.

25. A method according to claim 24 wherein the distribution function operates on the least significant bits of the identifier field.

26. A method according to claim 15 wherein the frame-based network is an Ethernet network and the header of the encapsulated data frame carries an Ethertype identifier which indicates that the data frame is encapsulated and forms part of a tunnelled path.

27. A computer readable medium encoded with computer executable instructions for causing a processor at a node of a frame-based network to perform the method of claim 15.

* * * * *